United States Patent [19]
Fatzinger et al.

[11] Patent Number: 5,628,006
[45] Date of Patent: *May 6, 1997

[54] COMPUTER PROGRAM PRODUCT AND PROGRAM STORAGE DEVICE FOR MERGING AND SEPARATING ATTRIBUTES OF CONSOLES

[75] Inventors: Peter A. Fatzinger, Poughkeepsie; Martin K. Leung, Wattingers Falls; Kevin Chou; Sockallingam Radhakrishnan, both of Poughkeepsie, all of N.Y.

[73] Assignee: International Business Machines Corporation, Armonk, N.Y.

[*] Notice: The term of this patent shall not extend beyond the expiration date of Pat. No. 5,491,819.

[21] Appl. No.: 488,028

[22] Filed: Jun. 7, 1995

Related U.S. Application Data

[63] Continuation of Ser. No. 368,767, Jan. 4, 1995, Pat. No. 5,491,819, which is a continuation of Ser. No. 775,204, Sep. 5, 1991, abandoned.

[51] Int. Cl.$^6$ ............................................. G06F 17/30
[52] U.S. Cl. .................. 395/618; 364/285; 364/285.2; 364/282.1; 364/DIG. 1; 395/602
[58] Field of Search .................. 395/600, 182.18; 364/282.1, 285

[56] References Cited

U.S. PATENT DOCUMENTS

| | | | |
|---|---|---|---|
| 3,900,834 | 8/1975 | Casey et al. | 395/421.11 |
| 4,507,751 | 3/1985 | Gawlick et al. | 395/182.18 |
| 4,555,772 | 11/1985 | Stephens | 395/155 |
| 4,809,170 | 2/1989 | Leblang et al. | 395/700 |
| 4,912,637 | 3/1990 | Sheedy et al. | 395/600 |
| 5,133,066 | 7/1992 | Hansen et al. | 395/600 |
| 5,187,790 | 2/1993 | East et al. | 395/650 |
| 5,201,044 | 4/1993 | Frey, Jr. et al. | 395/182.18 |
| 5,491,819 | 9/1991 | Fatzinger et al. | 395/600 |

*Primary Examiner*—Thomas G. Black
*Assistant Examiner*—Hosain T. Alam
*Attorney, Agent, or Firm*—Sterne, Kessler, Goldstein & Fox, P.L.L.C.; William J. Kinnaman, Jr.

[57] ABSTRACT

A program storage device and computer program product for performing merge transactions and non-failure rollback transactions between data structures without logging. The device and product comprise data structures objects (or consoles) comprising means for storing original attributes that define that object, means for storing apparent attributes merged into that object from the other object, means for storing a switch-to pointer, and means for storing a switch-chain pointer. The device and product may further comprise merging means for processing merge transactions, including means for switching the switch-to pointer of the second object to point to the first object, means for switching the switch-chain pointer of the first object to point to the second object to thereby form a switch chain, and means for logically ORing the apparent attributes of the first and second objects to thereby render the second object idle and permit the first object to control the attributes of the second object. The device and product may also include rollback means for rolling back a merge transaction, including means for removing the second object from the switch-chain, and means for logically ANDing the original attributes of the first object with the apparent attributes of the first object and storing the resulting group of attributes as new apparent attributes for the first object. Pluralities of objects may be merged into a single object as well.

19 Claims, 7 Drawing Sheets

Console A ("Main" Console)   Console B ("Failing" Console)   Console C ("Failing" Console)

COMPUTER PROGRAM PRODUCT AND PROGRAM STORAGE DEVICE FOR MERGING AND SEPARATING ATTRIBUTES OF CONSOLES

This application is a continuation of application Ser. No. 08/368,767, filed Jan. 4, 1995, now U.S. Pat. No. 5,491,819 issued to Fatzinger et al., which is a continuation of application Ser. No. 07/775,204, filed Sep. 5, 1991, now abandoned.

DESCRIPTION

1. Technical Field

The field of the invention relates generally to a system and method for merging and separating attributes of objects. More particularly, the present invention is directed to a data structure which permits simplified ADD, DELETE, MERGE and rollback transactions of attributes of consoles during non-failure situations.

2. Background Art

In a transaction-oriented environment, rollback is a kind of activity that removes the change made by a previous transaction. Rollback is needed for failure situation to ensure that the controlled resource is at a point of consistency. For non-failure situation, rollback is a way to get rid of a previous transaction whose effect on the controlled resource is no longer desired.

Traditionally, a full function database manager system (DBMS) handles this by writing the "undo" and "redo" records in its log which describes changes to the database. The "undo" information is used to simply back out work done in the past. When a certain transaction is to be backed out, whether it's a failure or a non-failure situation, the cascading effect of that transaction must be taken into consideration by the DBMS. The log is scanned backward from the last entry and a list is generated to identify those transactions that have a dependency on the transaction being rolled back. All the dependent transactions must be rolled back in the reverse order through their "undo" records. After the target transaction is rolled back, the "redo" record of each dependent transaction is then used to recover the database to its point of consistency. This is a rather error prone and time consuming procedure when the cascading effect is complex and the number of transactions involved is large.

In typical environments, rollback is constantly required in many normal, non-failure situations to remove effects of some previously executed transactions. Rollback requests can always be satisfied as long as all the transaction records are maintained through the traditional logging process. However, in those non-failure situations, logging is not a preferred mechanism because the excessive I/Os involved are too expensive.

In addition, logging is only needed to recover from failure situations. Volatile storage provides better performance for non-failure situations. Moreover, logging does not provide a way to easily handle the cascading effects.

To satisfy the requirements for non-failure type of rollbacks when performance and DASD storage are important concerns, some means other than logging is needed.

DISCLOSURE OF INVENTION

Rollback is the kind of activity that is needed for both failure and non-failure situations. For failure situations, rollback can only be achieved through logging transaction history on the non-volatile storage. For non-failure situation, logging is one possible rollback facility but is considered neither efficient nor economical. The present invention is directed to a new method and data structure for some environment to provide rollback facility for those non-failure type of transactions in a simple and systematic manner.

Furthermore, the present invention is directed to a system for performing merge transactions and non-failure rollback transactions between data structures without logging. The system comprises first and second data structure objects, wherein each object comprises: means for storing original attributes that define that object, means for storing apparent attributes merged into that object from the other object, means for storing a switch-to pointer, and means for storing a switch-chain pointer.

The system may further comprise merging means for processing a merge transaction, including: means for switching the switch-to pointer of the second object to point to the first object, means for switching the switch-chain pointer of the first object to point to the second object to thereby form a switch chain, and means for logically ORing the apparent attributes of the first and second objects to thereby render the second object idle and permit the first object to control the attributes of the second object.

The system may also include rollback means for rolling back a merge transaction, including: means for removing the second object from the switch-chain, and means for logically ANDing the original attributes of the first object with the apparent attributes of the first object and storing the resulting group of attributes as new apparent attributes for the first object.

In another embodiment including further objects, the merging means further comprises: means for switching the switch-to pointer of one or more of the further objects to point to the first object, means for switching the switch-chain pointer of the first object to point to the most recently switched further object to thereby add the most recently switched further object to the switch chain, means for switching the switch-chain pointer of the most recently switched further object to point to one of the second object or a previously switched further object, and means for logically ORing the apparent attributes of the first object and the apparent attributes of the one or more further objects to thereby render the one of more further objects idle and permit the first object to control the attributes of the one or more further objects.

In this embodiment the rollback means may further include: means for logically Oring the original attributes of the first object and the one or more further objects and storing the resulting group of attributes, and means for logically ANDing the resulting group of attributes with the apparent attributes of the first object and storing that further resulting group of attributes as new apparent attributes for the first object.

The foregoing and other objects, features and advantages of the invention will be apparent from the following more particular description of preferred embodiments of the invention, as illustrated in the accompanying drawings.

BRIEF DESCRIPTION OF DRAWINGS

The invention will be better understood if reference is made to the accompanying drawings in which.

BEST MODE FOR CARRYING OUT THE INVENTION

A more detailed description of some of the basic concepts discussed in this section is found in a number of references, including "An Introduction to Database Systems", Vols. I and II, by C. J. Date (Addison-Wesley Publishing Company, Inc., 1990).

Figure 1:
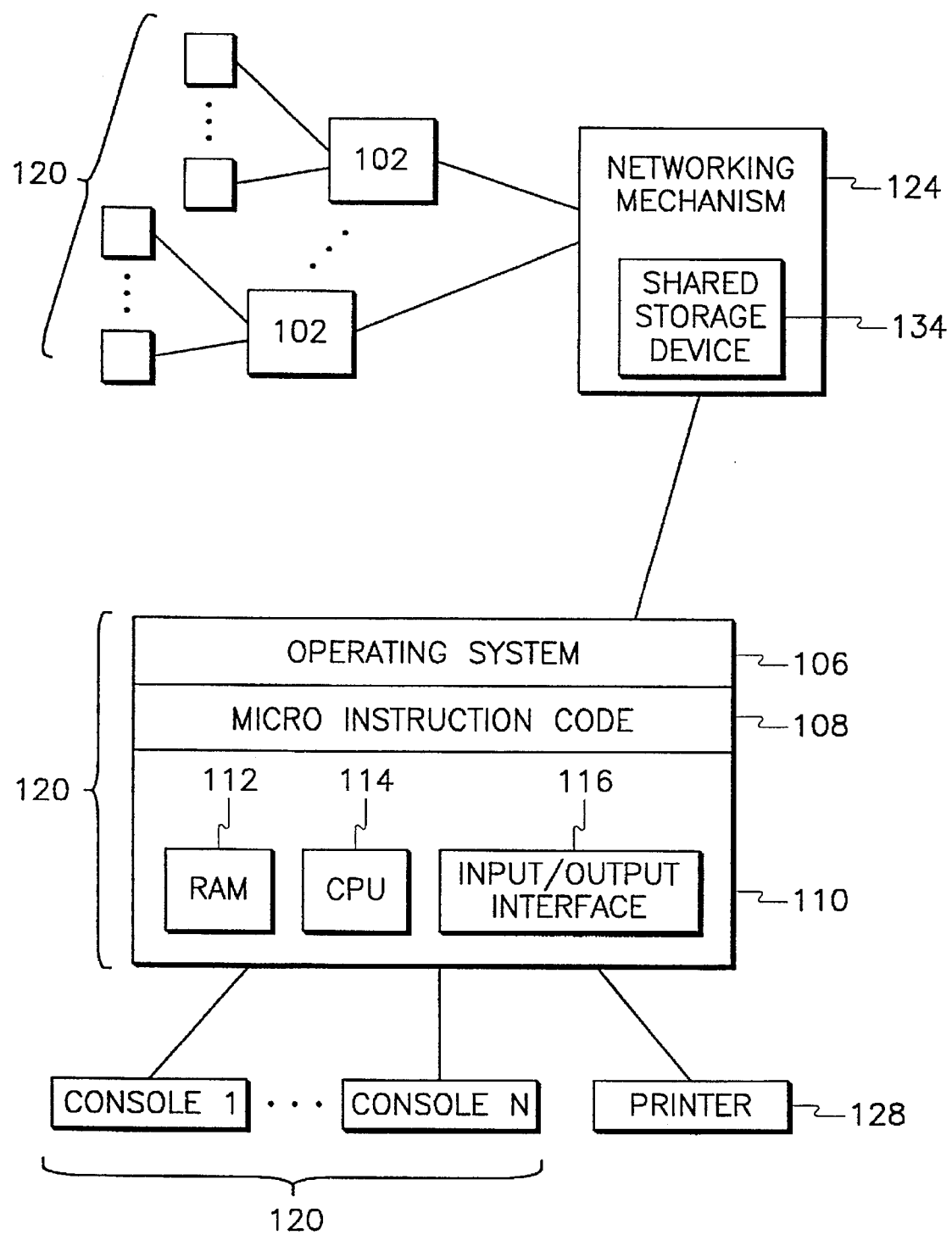
FIG. 1 shows a multiprocessor environment depicting a hardware implementation for merging and separating attributes of consoles in conjunction with the present invention.

An example of a multiprocessor environment depicting a hardware implementation for merging and separating attributes of consoles in conjunction with the present invention is shown in FIG. 1. Computer platforms 102 (individual processors) include a hardware unit 110, which includes a central processing unit (CPU) 114, a random access memory (RAM) 112, and an input/output interface 116. The RAM 112 is also called a main memory. Each of the computer platforms 102 may include a micro-instruction code 108 (or a reduced instruction set, for example), and an operating system 106.

The computer platforms 102 are shown networked via a known networking mechanism 124. A shared data storage device 134 (also called a direct access storage device, or DASD) may include hard disks and/or tape drives and their equivalents. The data storage device 134 represents non-volatile storage. Various peripheral components may be connected to each computer platform 102, such as any number of 1-N consoles 120, and a printing device 128.

In a preferred embodiment of the present invention, the computer platform 102 includes a computer having an IBM System ES/9000, ES/3090 or ES/4381 (model groups 90E, 91E and 92E) architecture. The operating system 106 which runs thereon is an IBM Multiple Virtual Storage (MVS/ESA V4). Those versed in the art will readily understand many equivalents to the above structure.

The system and method for merging and separating attributes of consoles in conjunction with the present invention (the present invention), is a component of the operating system 106 for each of the computer platforms 102 of FIG. 1.

In the above system, the consoles 120 are objects which have specific attributes, or functions that they perform. A switching console is a console that, for some reason, must switch off or otherwise become inactive. A switching console must therefore merge its functions to another console. The console receiving the attributes of the switching console is called the "main" console.

The main console will therefore takeover those merged functions. The main console may be another console on the same computer platform as the switching console, or it may be on a different computer platform. Attributes are merged between consoles of different computer platforms via the network mechanism 124. The attributes of more than one console can be switched to the main console.

In a similar manner, the computer platform themselves can be considered objects comprising attributes. Before a failing or exiting platform leaves the network its attributes can be merged with another platform.

Furthermore, the present invention permits transaction rollbacks. In a rollback, the merged attributes are moved form the main console (or main platform) back to the switched console (or switching platform) when that console (or platform) comes back on-line or when a rollback is requested.

For expository purposes, the terms object and console will be used interchangeably. In the above computer platform example, the platforms 102 comprise consoles. A console is defined as some object that contains a number of attributes (or functions) from zero to N. Attributes may simply be mechanisms by which a console receives messages. In another MVS example, routing codes are examples of attributes, and are characteristic of the consoles themselves. (A more detailed description of routing codes in the MVS environment is found in IBM MVS/ESA JCL Reference Manual (IBM Publication GC 28-1654).)

Consider an environment where three types of transactions, i.e., MERGE, ADD, and DELETE, can be used to alter the attributes of objects in that environment. The ADD type of transaction simply adds a new attribute to an object. The DELETE type of transaction simply removes an existing attribute from an object. And the MERGE type of transaction simply merges the attributes of one object into another object.

Such an environment may also have certain requirements. First, more than one object can be merged into a single object, i.e., object A and object B can both be merged into object C.

Second, the ADD and DELETE transactions can still be operated on an object after some other objects have been merged into that object, i.e., if object A is merged into object B, it is still allowed to perform ADD and/or DELETE transactions on object B.

Third, the effects of ADD and DELETE transactions must be preserved after rollback of some prior MERGE transaction, i.e., if object A was merged into object B, and an ADD transaction was executed on object B, then after rollback of the MERGE transaction, the effect of ADD transaction should be preserved in object B.

Fourth, the effects of ADD and DELETE transactions need not be preserved for an object if followed by a MERGE transaction, i.e., if object A was merged into object B, then a DELETE transaction was executed on object B, and then object C was merged into object B, the effect of DELETE transaction need not be preserved after rollback of merger for A, since the merger of C might potentially overwrite the effect of the DELETE transaction on object B.

Traditional logging processes do not provide a satisfactory solution to this type of problem, and maintaining a complete history of transactions in the real storage is not feasible.

The data structure and method of the present invention is therefore faced with the following challenges:

save just essential information, not the entire transaction history;

specify a special mechanism to perform MERGE, ADD and DELETE transactions in this environment; and include a rollback method that manipulates those data structures.

The method can be described as follows. The MERGE transaction merges two objects together, e.g., object B merges with object A. As a MERGE transaction occurs on object A, the data structure keeps track of (by storing or listing in a known manner) object A's original attributes (the attributes object A comprises before the merge) and apparent attributes (the attributes object A comprises after the merge with object B). The ADD transaction adds attributes to an object, e.g., attribute X is added to object A. The DELETE transaction deletes attributes to an object, e.g., attribute Y is removed from object A.

The structure and function of the data structure for each object will now be described with reference to FIGS. 2A-D and various transactions.

Figure 2A:
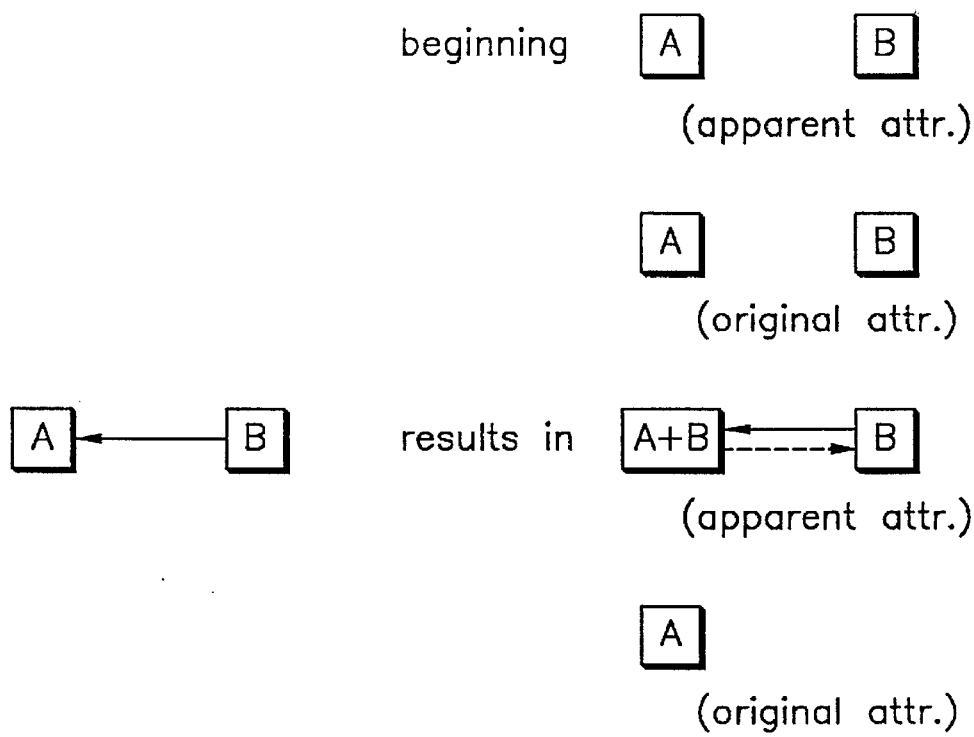
FIGS. 2A–D show a data structure for/implementing merging and separating attributes of consoles in conjunction with the present invention.

FIG. 2A depicts a MERGE of object B into object A. The MERGE transaction is indicated on the left hand side of the figure with a solid arrow pointing from object B into object A. The transaction shown on the left hand side of FIG. 2A "results in" the object data structures shown on the right hand side of the figure.

A's data structure comprises two sets of attributes. The first set is called the original attribute set (abbreviated "original attr."). As the name implies, the original attribute set lists, or otherwise stores in a known manner, the attributes originally belonging to object A, before any merging takes place.

After the MERGE transaction the data structure for object A includes all the attributes of both objects A and B. This is represented by a second set called the apparent attribute set (abbreviated "apparent attr."). The apparent attribute set lists, or otherwise stores in a known manner, the original attributes as well as any new attributes from the merging object.

Again, the solid line depicts an object MERGE (i.e., from object B to object A). The dashed line is a record of all the objects merged to the recipient (i.e., all the objects merged to object A).

Figure 2B:
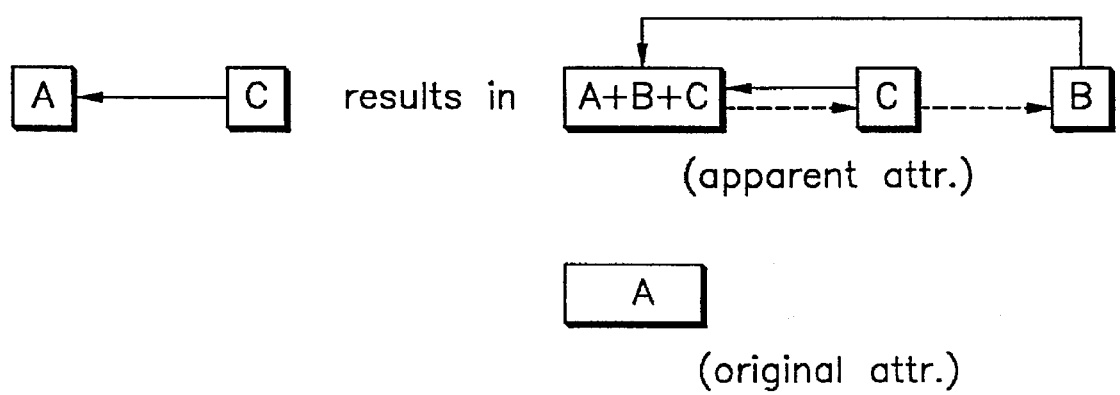

FIG. 2B depicts a MERGE of attributes from an object C into object A. The MERGE transaction is indicated on the left hand side of the figure with a solid arrow pointing from the object C into object A. The transaction shown on the left hand side of FIG. 2B "results in" the data structures shown on the right hand side of the figure.

The apparent attributes of object A now include the attributes of objects A, B and C. The solid lines depict an object MERGE (i.e., from object B to object A, and from object C into object A). The dashed lines are a record of all the objects merged to the recipient (i.e., all the objects merged to object A). Object A's original attributes have not changed.

Figure 2C:
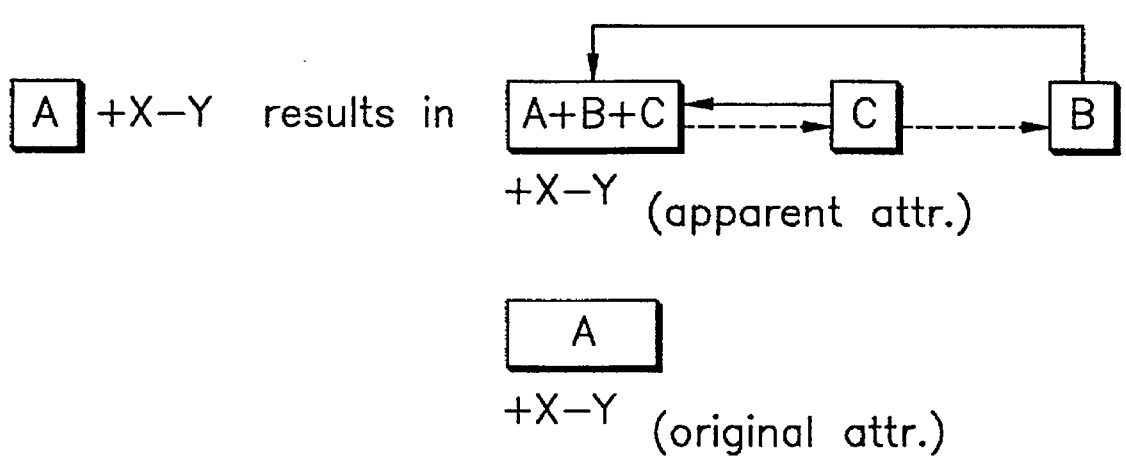

Turning now to FIG. 2C, the ADD and DELETE transactions will be discussed. ADD attribute X to object A and DELETE attribute Y from object A results in the data structures shown on the right hand side of FIG. 2C. The data structures are similar to those shown in FIG. 2B except the apparent attributes of object A now include the attribute X, and the attribute Y has been excluded from object A. Since the ADD and DELETE transactions were performed directly on object A, object A's original attributes also reflect the changes.

Figure 2D:
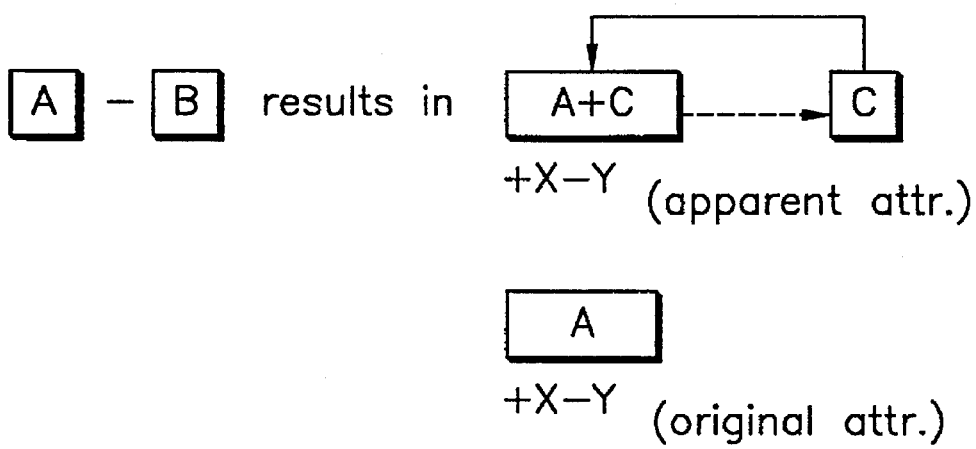

An example of a rollback transaction will now be discussed with reference to FIG. 2D. The rollback transaction shown in FIG. 2D removes the attributes of object B from object A. Object B itself is no longer shown merged into object A via a solid arrow.

Note that, after the rollback of object B, object A is still merged with object C (the dashed line from object A to object C still exists). In addition, the changes done to A (adding attribute X and deleting attribute Y) are still intact. Thus, if object C had happened to contain attribute Y, it would not be given back to object A because of the records maintained in object A's data structure.

A set of mathematical representations of the above transactions will now be explained.

Let $Xi_a$ represent the apparent attributes of an object "i" and let $Xi_o$ represent the original attributes of an object "i" before the merge where i={A,B,C,D, . . .}. Initially, the apparent attributes of A are the same as the original attributes of A before any merge transaction occurs. Therefore:

$$XA_a = XA_o$$

A MERGE of object B into object A is represented as:

$$XA_a = XA_a \cup XB_a$$

The UNION symbol "$\cup$" represents a logical OR operation of the attributes of the objects.

The following are further examples:

MERGE object C into object A $$XA_a = XA_a \cup XC_a$$

ADD attribute x to object A $$XA_a = XA_a + x$$

x is added to the apparent attributes of object A.

$$XA_o = XA_o + x$$

x is also added to the original attributes of object A.
DELETE attribute y from object A $$XA_a = XA_a - y$$

y is removed from the apparent attributes of object A.

$$XA_o = XA_o - y$$

y is also removed from the original attributes of object A.
Rollback: remove object B from object A $$XA_a = (XA_o \cup XC_o) \cup XA_a$$

The INTERSECT symbol "$\cup$" represents a logical AND operation of the attributes of the objects.

The rollback method has the following effects:

1. The UNION operation determines those attributes of the remaining objects that were merged into object A. This could include those attributes that were specifically added/deleted to object A after the first MERGE operation.

2. The INTERSECT operation then filters out those attributes that were specifically deleted from object A.

The INTERSECT operation takes no action on those attributes that were specifically added to object A, because those attributes were added in $XA_a$ as well as in $XA_o$.

3. The end result reasonably preserves the effects of ADD and DELETE operations executed on object A after the first MERGE operation took place.

In this series of operations, the cascading effects of the "undo" and "redo" operations have been greatly simplified.

The order of transactions no longer needs to be a factor in the rollback of attributes from the objects. The data structure itself contains the historical information of each transaction, without the overhead of a separate log entry for each operation. The elegance of this solution stems from the simplicity of the data structure (basically a storage area of the apparent and original attributes for each object), the disappearance of the bulky log entries detailing every transaction, and the accuracy of the underlying method which allows rollback to occur. This method therefore provides a performance improvement in the method and a storage improvement in the data structure usage.

MVS EXAMPLE

Figure 3:
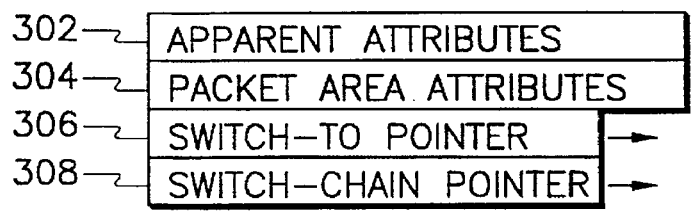
FIG. 3 shows an example of a data structure in conjunction with the present invention.
Figure 4:
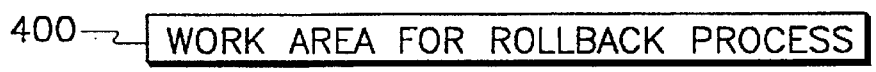
FIG. 4 shows an example of a work area field used to store intermediate results during the rollback process in conjunction with the embodiment of the data structure shown in FIG. 3 of the present invention.

The following is a specific example of the present invention in an MVS environment in which a console is an object, whose attributes are routing codes. FIG. 3 shows an example of a data structure for a console 300. The console 300 comprises an apparent attributes field 302, a packet area attributes field 304, a switch-to pointer field 306 and a switch-chain pointer field 308. The size of the apparent attributes field 302 and the packet area attributes field 304 are the same. A work area field 400 of FIG. 4 is used to store intermediate results during the rollback process. The packet area attributes are equivalent to the original attributed discussed above in the general description of the present invention.

Figure 5:
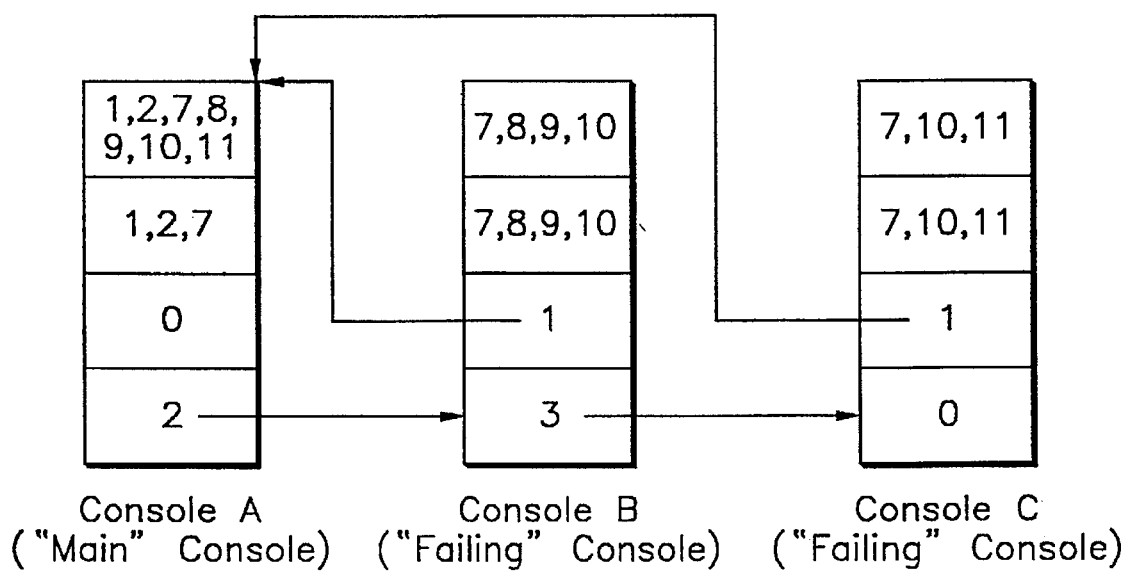
FIG. 5 shows the structure of three consoles in a further embodiment of the present invention.

FIG. 5 shows the structure of three consoles A, B and C. Both consoles B and C are merged into console A, and therefore may be considered "failing" consoles for this example. Hence, console A is performing (or controlling) the attributes for both consoles B and C.

Turning now to FIGS. 6A-D, again assume the three consoles include the following packet areas (also called their original attributes):

Console A has route codes 1, 2, 7.
Console B has route codes 7, 8, 9, 10.
Console C has route codes 7, 10, 11.

Assume attribute X is the route code 6. Assume attribute Y is the route code 7. The MERGE function is implemented as a console switch. The ADD function is implemented as a VARY CN(console),AROUT=command. The DELETE function is implemented as a VARY CN(console),DROUT= command. The VARY command is used to modify routing attributes of a console. The operation as described above with reference to FIGS. 2A-D will now be performed with the above assumptions, but only the apparent attributes of consoles A, B and C and the packet area attributes of console A will be addressed.

Figure 6A:
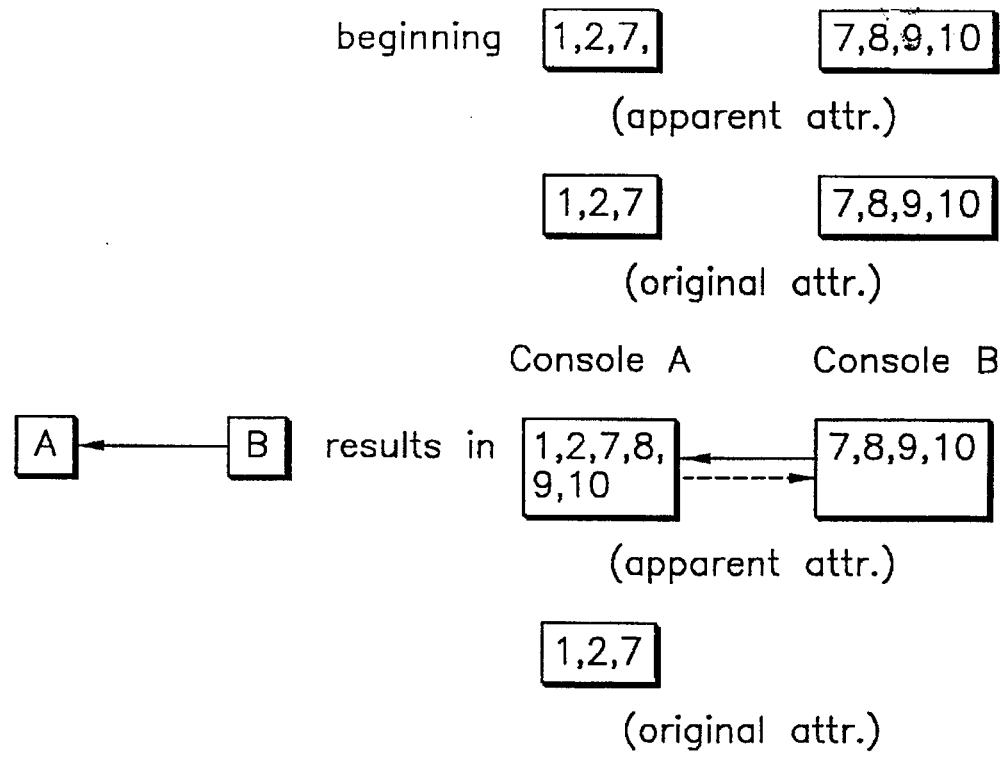
FIGS. 6A–D show an example of merging and separating attributes of consoles with a data structure similar to that shown in FIGS. 2A–D.

FIG. 6A shows the MERGE of console B into console A (a console switch operation). Console A's original attributes are 1,2 and 7 and after the console switch, console A's apparent attributes are 1, 2, 7, 8, 9 and 10.

Figure 6B:
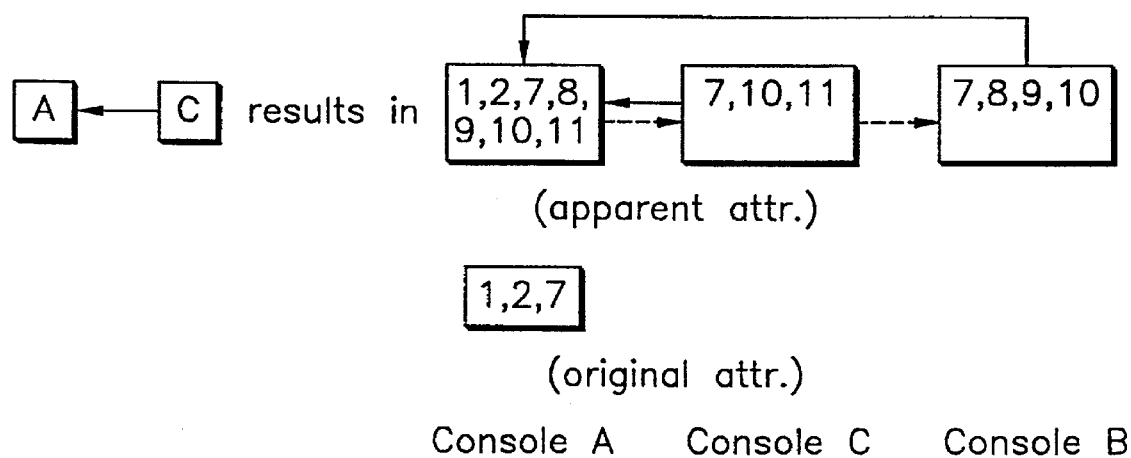

FIG. 6B shows the MERGE of console C into console A (another console switch). Console A's original attributes do not change, but its apparent attributes now include routing codes 1, 2, 7, 8, 9, 10 and 11. Note only one new routing code 11 was picked up by console A because of the second console switch.

Figure 6C:
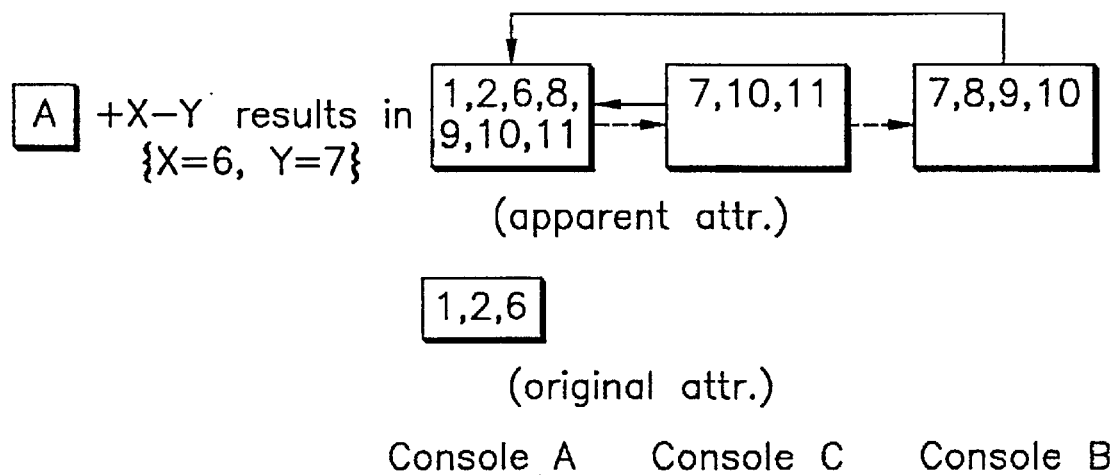

FIG. 6C shows an ADD operation which adds attribute X to console A using the command, VARY CN(A),AROUT=6. In addition, a DELETE operation is shown which deletes attribute Y from console A using the command, VARY CN(A),DROUT=7. Note that a new routing code 6 has been added to both the original and apparent attribute sections of console A's data structure. Note also, that routing code 7 has been deleted from console A's original and apparent attribute sections.

Figure 6D:
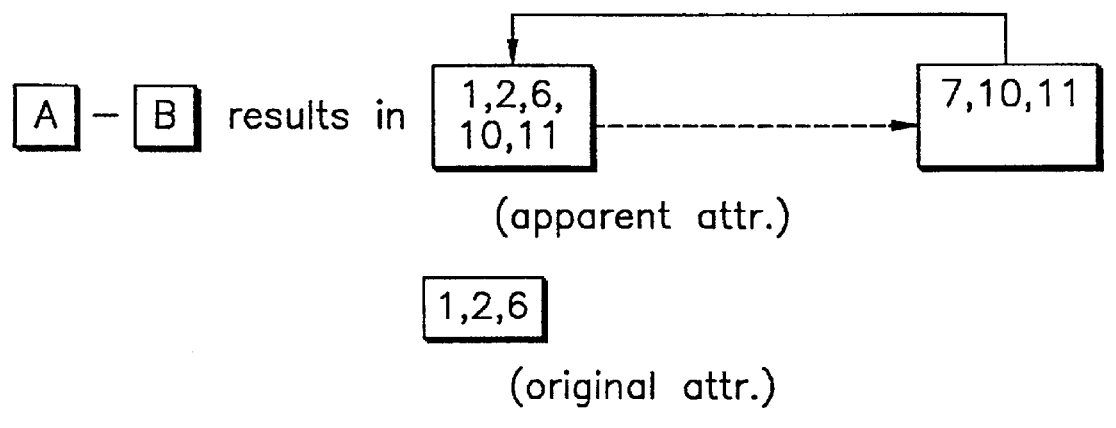

Finally, FIG. 6D shows the rollback of a transaction, in which the route codes of console B are removed from console A. The original attribute routing codes of consoles A and C are logically OR'ed and that result is logically AND'ed with the apparent attribute route codes of console A. $(XA_a = (XA_o \cup XC_o) \cup XA_a)$.

The method and the data structure described above fit in nicely in many real life environments with objects that are subject to ADD, DELETE, and MERGE types of transactions, and non-failure type of rollback for MERGE is required. For example, in the MVS system operation environment, it is straight forward to think that an MVS console is a kind of object whose property is its apparent routing attributes. The VARY command is used for modifying the routing attributes of a console are simply ADD or DELETE type of transactions. The console switch activity which transfers the entire set of apparent routing attributes from one console to another is the MERGE type of transaction. Console switch occurs as a result of either console failure or user initiated request. It is required to rollback the effect of console switch when a previously switched console is back to service. The invention described above allows MVS operation to provide the rollback facility in an efficient and economical manner without using the traditional logging mechanism. The method along with the mechanism can also be easily extended to other applications such as network servers, operating system work load manager, and the like.

Figure 7:
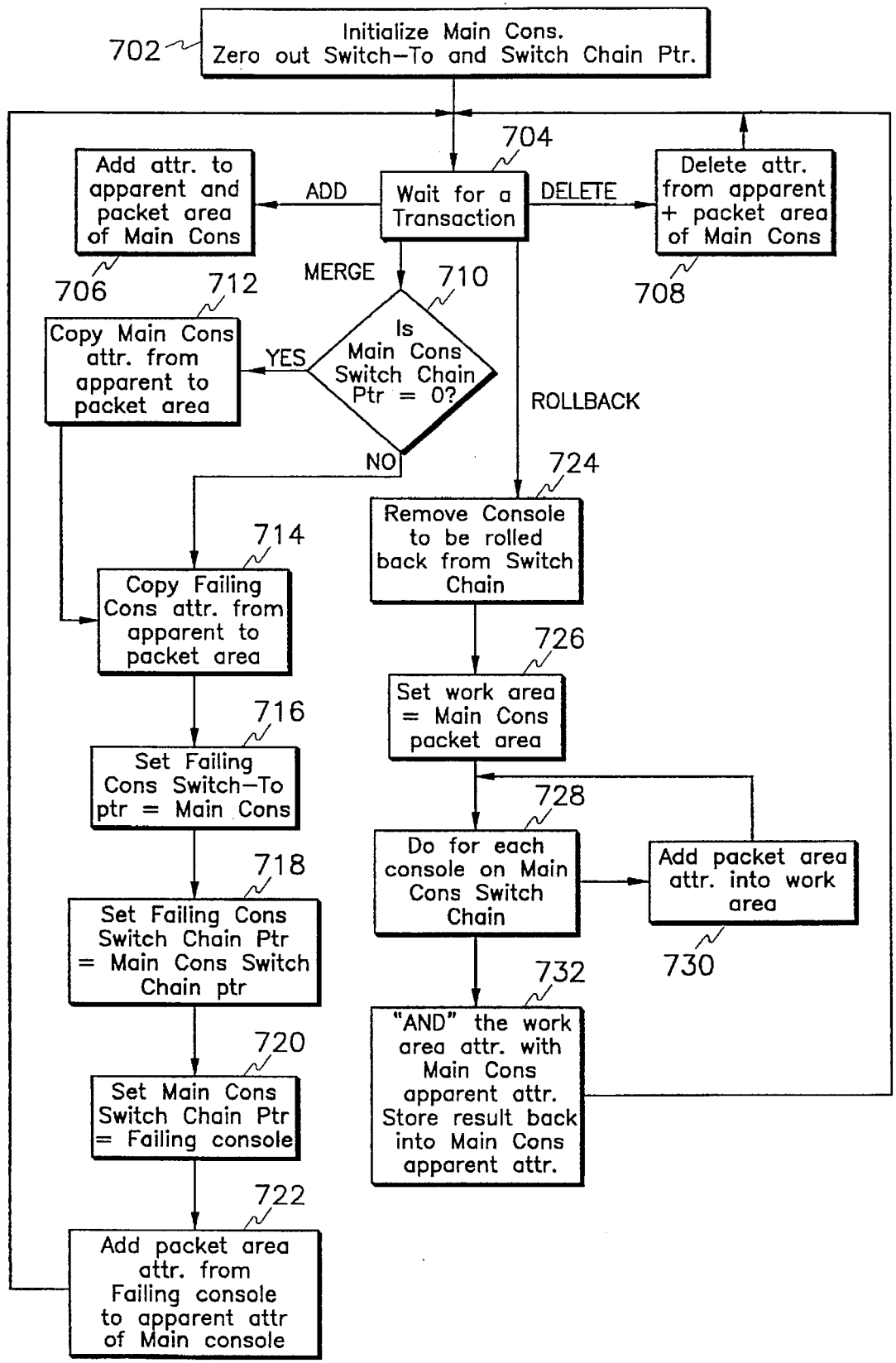
FIG. 7 shows a flowchart showing the flow of operation of a system that supports the ADD, DELETE, MERGE and ROLLBACK transactions in conjunction with the present invention.

FIG. 7 depicts a flowchart showing the flow of operation of a system that supports the ADD, DELETE, MERGE and ROLLBACK transactions. Step 702 represents the initializing of the main console, which is console A in the above example, and the zeroing out of that consoles switch-to and switch-chain pointers.

The system then enters a waiting state, as shown at step 704. The system waits for one of four possible transactions to be initiated. If an ADD transaction transpires, the system adds the attribute to the apparent and packet areas of the main console, as shown at step 706. Flow then transfers back to the wait step 704. If a DELETE transaction occurs, the system deletes the attribute to the apparent and packet areas of the main console, as shown at step 708. Flow then transfers back to the wait step 704.

If a MERGE transaction takes place, the system checks if the switch-chain of the main console is equal to 0 (see conditional step 710). If the result is YES, flow proceeds to step 712 and the main console's apparent attributes are copied to its packet area. If the result is NO, then no copy is performed. In either case, the flow proceeds to step 714 and the apparent attributes of the failing (switching) console are copied to the packet area of the failing console.

Next, the failing console's switch-to pointer is set equal to the main console (see step 716). Then the failing console's switch-chain pointer is set equal to the main console's switch-chain pointer (see step 718). The main console's switch-chain pointer is then set equal to the failing console (see step 720). Thus, the switch-chain pointer of the main console will point to the most recently merged console. In a further embodiment, the switch-chain pointer of the main console could alternatively be set to point to the first merged console.

Finally, the MERGE transaction is ended by adding the packet area attributes of the failing console to the apparent attributes of the main console (see step 722). Step 722 represents the above discussed ORing operation between the apparent attributes of the switching console and the original attributed of the console being switched to. Flow then transfers back to the wait step 704.

If a ROLLBACK transaction is initiated, the system proceeds to remove the console to be rolled back from the switch-chain, as shown at step 724. This is done by changing the switch-chain pointer of the previous console in the chain to the next console in the chain. The work area is then set equal to the main console's packet area (see step 726).

Next, the packet area attributes of all of the consoles in the main console's switch-chain are logically OR'ed and stored in the work area. This procedure is represented by the do-loop comprising steps 728 and 730. Lastly, the attributes in the work area are logically AND'ed with the main console's apparent attributes, and the resulting attributes are stored as new apparent attributes for the main console (see step 732). Flow again loops back to the wait step 704.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A program storage device readable by a machine, tangibly embodying a program of instructions executable by the machine to perform method steps for performing a merging transaction between data structure objects, said method steps comprising:
    switching a switch-to pointer of a first object to point to a second object;
    switching a switch-chain pointer of said second object to point to said first object to thereby form a switch chain; and
    logically ORing apparent attributes of said first object with the apparent attributes of said second object to thereby render said first object idle and permit said second object to control the attributes of said first object.

2. The program storage device of claim 1, wherein said method steps further comprise the method step of:
    adding at least one further attribute to an original attribute storing means and an apparent attribute storing means of said second object.

3. The program storage device of claim 1, wherein said method steps further comprise the method step of:
    deleting at least one further attribute from an original attribute storing means and an apparent attribute storing means of said second object.

4. The program storage device of claim 1, wherein said method steps further comprise the method step of rolling back a transaction, said method step of rolling back a transaction further comprising the method steps of:
    removing an idle object from said switch-chain;
    logically ORing original attributes of all objects remaining in said switch-chain and storing the resulting group of attributes; and
    logically ANDing said stored group of attributes with apparent attributes of said second object and storing that further group of attributes as new apparent attributes for said second object.

5. A program storage device readable by a machine, tangibly embodying a program of instructions executable by the machine to perform method steps for performing non-failure rollback transactions between data structure objects without logging, said method steps comprising:
    removing an idle object from a switch-chain comprising a main object and at least one of idle objects and further idle objects;
    logically ORing original attributes of all objects remaining in the chain and storing the resulting group of attributes; and
    logically ANDing said stored group of attributes with apparent attributes of said main object and storing that further group of attributes as new apparent attributes for said main object.

6. The program storage device of claim 5, wherein said method steps further comprise the method step of:
    adding at least one further attribute to an original attribute storing means and an apparent attribute storing means of said main object.

7. The program storage device of claim 5, wherein in said method steps further comprise the method step of:
    deleting at least one further attribute from an original attribute storing means and an apparent attribute storing means of said main object.

8. A computer program product for use in a computer system, said computer program product comprising:
    a computer usable medium having computer readable program code means embodied in said medium for causing a computer to perform merge transactions and non-failure rollback transactions between data structures without logging, said computer readable program code means comprising:
    (a) computer readable program code means for causing a computer to store first and second data structure objects, each object comprising:
        (i) computer readable program code means for causing a computer to store original attributes that define that object;
        (ii) computer readable program code means for causing a computer to store apparent attributes merged into that object from the other object;
        (iii) computer readable program code means for causing a computer to store a switch-to pointer; and
        (iv) computer readable program code means for causing a computer to store a switch-chain pointer; and
    computer program code means for causing a computer to perform at least one of:
    (b) processing a merge transaction, including:
        (i) computer readable program code means for switching said switch-to pointer of said second object to point to said first object;
        (ii) computer readable program code means for switching said switch-chain pointer of said first object to point to said second object to thereby form a switch chain; and
        (iii) computer readable program code means for logically ORing said apparent attributes of said first and second objects to thereby render said second object idle and permit said first object to control the attributes of said second object; and
    (c) rolling back a merge transaction, including:

(i) computer readable program code means for removing said second object from said switch-chain; and (ii) computer readable program code means for logically ANDing said original attributes of said first object with said apparent objects of said first object and storing the resulting group of attributes as new apparent attributes for said first object.

9. The computer program product of claim 8, further comprising:

computer readable program code means for adding at least one further attribute to said original attribute storing means and said apparent attribute storing means of said main object.

10. The computer program product of claim 8, further comprising:

computer readable program code means for deleting at least one further attribute from said original attribute storing means and said apparent attribute storing means of said main object.

11. The computer program product of claim 8, wherein said computer system comprises a network, and each object comprises a computer having one of zero or more objects having zero or more attributes, said computers being interconnected by said network.

12. The computer program product of claim 8, wherein said computer system comprises a network of interconnected computers, and each computer comprises one of zero or more objects having zero or more attributes.

13. The computer program product of claim 12, wherein said objects are consoles and said attributes are route objects.

14. A computer program product for use in a computer system, said computer program product comprising:

a computer usable medium having computer readable program code means embodied in said medium for causing a computer to perform merge transactions and non-failure rollback transactions between data structures without logging, said computer readable program code means comprising:

(a) computer readable program code means for causing a computer to store first, second, and further data structure objects, each object comprising:

(i) computer readable program code means for causing a computer to store original attributes;

(ii) computer readable program code means for causing a computer to store apparent attributes merged into that object from other objects;

(iii) computer readable program code means for causing a computer to store a switch-to pointer; and (iv) computer readable program code means for causing a computer to store a switch-chain pointer; and computer program code means for causing a computer to perform at least one of:

(b) processing a merge transaction, including:

(i) computer readable program code means for switching said switch-to pointer of said second object to point to said first object;

(ii) computer readable program code means for switching said switch-chain pointer of said first object to point to the most recently switched further object to said switch-chain;

(iv) computer readable program code means for logically ORing said apparent attributes of said first object and said apparent attributes of said one or more further objects to thereby render said one or more further objects idle and permit said first object to control the attributes of said one or more further objects; and (c) rolling back a merge transaction, including:

(i) computer readable program code means for removing said one or more further objects from said switch-chain;

(ii) computer readable program code means for logically ORing the original attributes of said first object and said one or more further objects and storing the resulting group of attributes; and (iii) computer readable program code means for logically ANDing said resulting group of attributes with said apparent attributes of said first object and storing that further resulting group of attributes as new apparent attributes for said first object.

15. The computer program product of claim 14, further comprising:

computer readable program code means for adding at least on further attribute to said original attribute storing means and said apparent attribute storing means of said main object.

16. The computer program product of claim 14, further comprising:

computer readable program code means for deleting at least one further attribute from said original attribute storing means and said apparent attribute storing means of said main object.

17. The computer program product of claim 14, wherein said computer system comprises a network, and each object comprises a computer having one of zero or more objects having zero or more attributes, said computers being interconnected by said network.

18. The computer program product of claim 14, wherein said computer system comprises a network of interconnected computers, and each computer comprises one of zero or more objects having zero or more attributes.

19. The computer program product of claim 18, wherein said objects are consoles and said attributes are route objects.

* * * * *